(12) United States Patent
Roberts

(10) Patent No.: US 6,409,135 B1
(45) Date of Patent: Jun. 25, 2002

(54) BASE SPACER

(75) Inventor: Gerald Bernard Roberts, Monroe, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/456,314

(22) Filed: Dec. 8, 1999

(51) Int. Cl.[7] .................................................. A47F 5/00
(52) U.S. Cl. ...................... 248/300; 248/74.1; 248/230; 248/229.15
(58) Field of Search ................................. 248/300, 230, 248/229.15, 74.1, 231.21, 71, 217.1, 65

(56) References Cited

U.S. PATENT DOCUMENTS

| | | | | |
|---|---|---|---|---|
| 2,970,799 A | * | 2/1961 | Pinson | 248/230 |
| 3,318,561 A | * | 5/1967 | Finke | 248/229 |
| 4,729,532 A | * | 3/1988 | Moss | 248/74.1 |
| 4,844,397 A | * | 7/1989 | Skakoon et al. | 248/231.7 |
| 4,909,463 A | | 3/1990 | Zvanut et al. | |
| 5,044,584 A | * | 9/1991 | Lin | 248/68.1 |
| 5,224,241 A | * | 7/1993 | Williams | 16/253 |
| 5,478,038 A | * | 12/1995 | Thorp et al. | 248/230.9 |

* cited by examiner

Primary Examiner—Anita King
Assistant Examiner—Kimberly Wood
(74) Attorney, Agent, or Firm—Alfred N. Goodman; Marcus R. Mickney

(57) ABSTRACT

A base spacer that is useful for securing a horizontal member to a vertical support with accurate vertical and horizontal position has an extended horizontal surface and at least one deformable finger extending vertically from this horizontal surface. The horizontal surface also has: (a) a pair of oval openings dimensioned to receive securing bolts, wherein the deformable finger extends from the horizontal surface at less that a right angle for a distance sufficient to contact a horizontal member secured by the spacer.

8 Claims, 5 Drawing Sheets

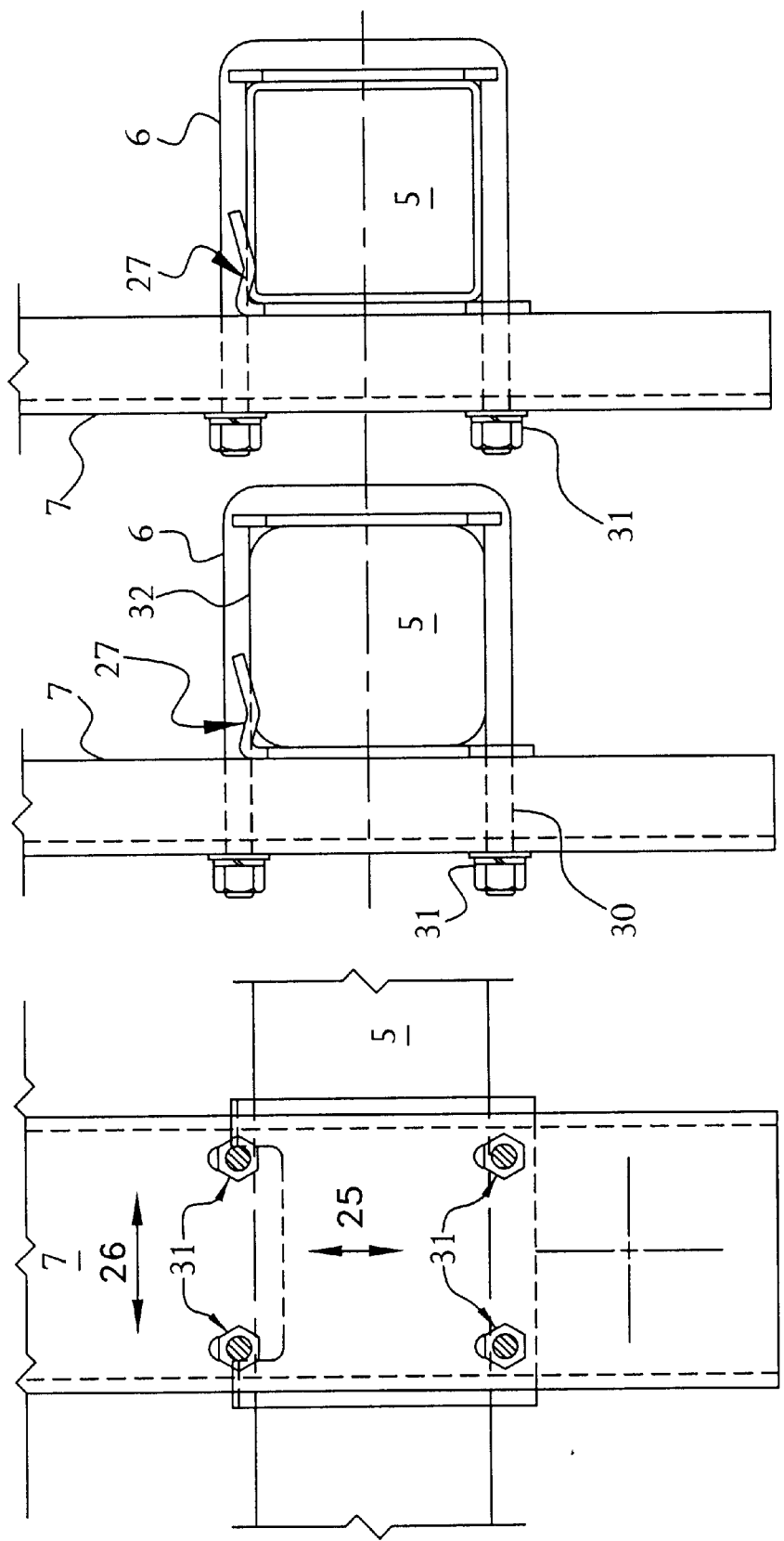

BASE SPACER

FIELD OF THE INVENTION

The invention relates to a base spacer that is useful for securing a horizontal member to a vertical member in a desired vertical and horizontal position.

BACKGROUND OF THE INVENTION

Electrical switch pole units must be secured to support members with sufficient force to provide a secure arrangement that permits careful alignment of the supported member to the support. In the case of an electrical telephone or power pole, the horizontal support beam must securely hold the electrical switching components that vertically extend therefrom.

One example of a clamping arrangement for power poles is shown in U.S. Pat. No. 4,909,463, the disclosure of which is herein incorporated by reference. The clamp of this patent includes a pole unit base and a dead-end bracket secured around a horizontal support member by a single U-bolt. Deformable "tangs" are used in the connection to provide a securing force when tightened about the horizontal support member.

It would be desirable to have a support system that was useful for securing a vertically extending member to a horizontal support.

SUMMARY OF THE INVENTION

The invention relates to a base spacer plate that is useful for securing a vertically extending first member to a horizontally extending second member, wherein the spacer has an extended horizontal surface and at least one deformable finger extending vertically from the horizontal surface. The horizontal surface also has: (a) a pair of oval openings dimensioned to receive and locate securing bolts, and (b) a channel along one edge of said spacer that exhibits a length sufficient to align opposite legs of U-bolts used to secure the vertical and horizontal members, wherein said deformable finger extends from said horizontal surface at less than a right angle.

The spacer plate of the invention is useful for providing accurate vertical and horizontal alignment for vertical members mounted to a horizontal bearing surface as well as prevent movement of the vertical member relative to the horizontal member when uneven side force is applied to either end of the vertical member.

BRIEF DESCRIPTION OF THE DRAWINGS

FIGS. 3–5 show the spacer plate as used for securing a vertical member to a horizontal support.

DETAILED DESCRIPTION

The invention is conveniently described with reference to the enclosed figures.

Figure 2:
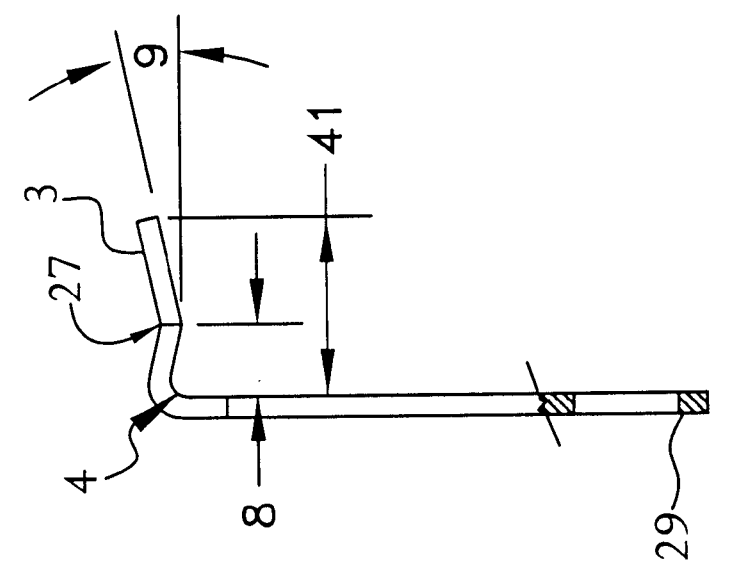
FIG. 2 is a side illustration of the spacer plate from FIG. 1.
Figure 1:
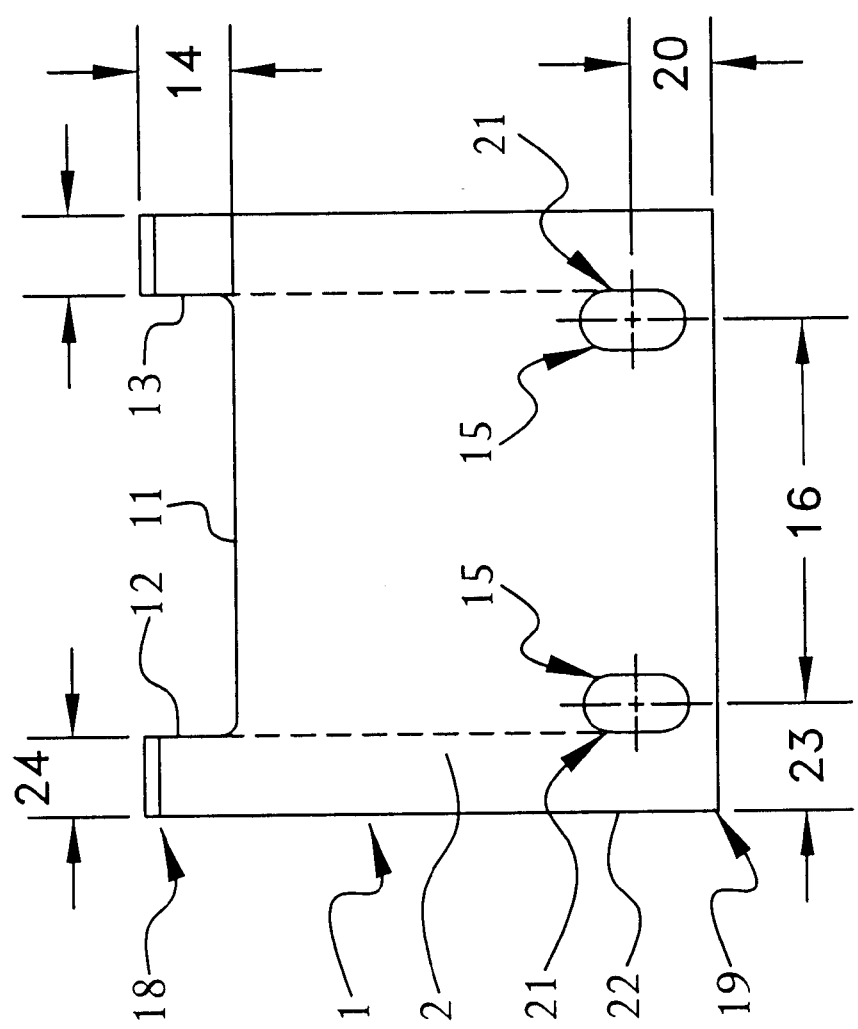
FIG. 1 is a frontal view of a spacer plate of the invention.
Figure 6:
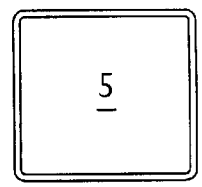
FIGS. 6–9 illustrate the use of a base spacer according to the invention to secure a horizontal member to a vertical member.
Figure 7:
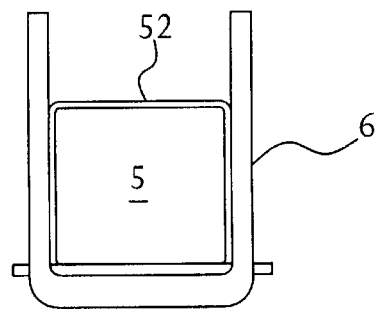
Figure 8:
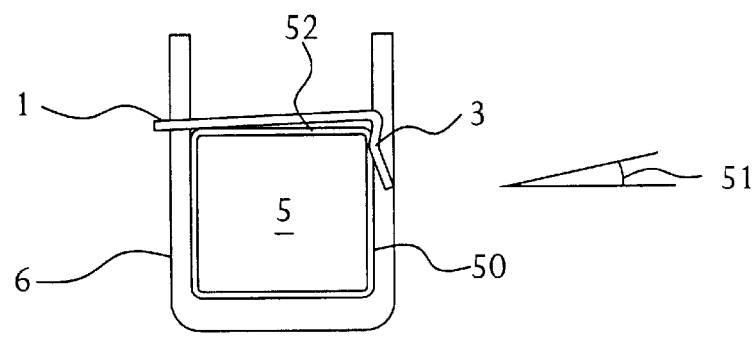
Figure 9:
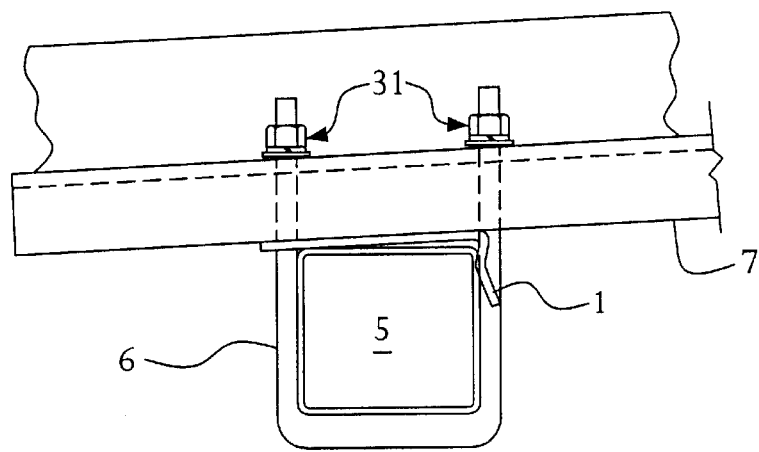

FIG. 1 is a top view of base spacer 1. FIG. 2 is a side view. Please note that the terms "horizontal" and "vertical" are used solely as directional frame of reference. In use, the spacer plate can be installed in virtually any planar orientation without affecting its function or performance. The following description will relate to a spacer plate standing vertically as it would be used for securing a vertical beam member against a horizontal support member.

Base spacer 1 has a substantially flat vertical plate surface 2 with a pair of fingers 3 that extend horizontally from plate surface 2 at an angle 4 that is less than a right angle, i.e., 90° and at an angle sufficient to contact the outer surface of a horizontal member 5 when secured by base spacer 1 with bolts 6 against a vertical support member 7. (See FIGS. 3–5.) Preferably, angle 4 is within the range from about 45° to 85°. Even more preferably, angle 4 is at an angle within the range of 60° to 80° relative to plate surface 2.

After a distance 8, vertical fingers 3 are bent away from plate surface 2 at an angle 9 that is sufficient to increase the amount of force needed to bend finger 3 over distance 8 away from plate surface 2 as spacer 1 is tightened against horizontal member 5. Angle 9 increases relative to a perpendicular plane from plate surface 2 at bend 32. Fingers 3 extend from the surface of plate 10 for a total distance 41 and increases the length of distance 8.

In the embodiment depicted, spacer plate 2 has a top edge 18 and a bottom edge 19. Channel 11 on top edge 18 is located between a pair of fingers 3 with a width 15 that can vary depending on the amount of urging force desired on the surface of vertical member 7 that will be secured by plate 1. Channel 11 has interior edges 12, 13 extending towards the center of plate 11 for a distance 14.

Elongated bolt holes 15 are located on plate 1 opposite channel 11 toward bottom edge 19 and are spaced on centers separated by distance 16. The centers of bolt holes 15 are spaced from bottom edge 19 by a distance 20.

Bolt holes 15 are also spaced on center from lateral edges 22 of plate 1 by a distance 23 on center with a diameter sufficient to allow outer edges 21 of holes 15 to be spaced from lateral edge 22 by a distance 24 and aligned with interior edges 12, 13 (as shown by the dotted line). With such dimensions, a pair of U-bolts 6 will fit through holes 15 as well as against interior edges 12, 13 of fingers 3.

Space plate 1 may come in a variety of physical dimensions to secure a variety of sized members against horizontal movement. To that end, plate 1 may have a length 28 between the bottom edge 27 at bend 8 on fingers 3 and bottom edge 29 of elongated bolt holes 15.

Vertical member 7 is secured in position with spacer plate 1 by passing one leg of each U-bolt 6 through elongated bolt hole 15. The other leg of U-bolt 6 is passed into channel 11 between fingers 3. The male end of each U-bolt 6 is then passed through a hole 30 in vertical member 7 and secured thereto with nut 31.

The dimensions of plate 1 should be sufficient so that bottom edge 27 at bend 8 contacts the upper surface 32 of horizontal member 5. As nuts 31 are tightened, spacer 1 pulls down on the mating surface of horizontal member 5 and pulls the edge of slots 29 tight against U-bolts 6. The spacer secures the U-bolts in position and structurally secure U-bolts 6 to horizontal member 5 as bearing members.

FIGS. 6–9 illustrate the steps used to secure vertical member 7 to horizontal member 5 using U-bolts 6, spacer plate 1, and nuts 31. As shown by FIGS. 6–9, U-bolts 6 are loosely placed around horizontal member 5. Spacer 1 is then positioned over the upright legs of U-bolts 6 so that vertical fingers 3 engage lateral side surface 50 on horizontal member 5. Angle 4 and length 8 to bend 27 cause spacer 1 to rest at an angle 51 relative to the upper surface 52 of horizontal member 5. Vertical member 7 is then placed over U-bolts 6 and secured with nuts 31. As nuts 31 are tightened, angle 51 is reduced until vertical member 7 is flat against spacer 1 against upper surface 52. Pressure from the angular deformation of vertical fingers 3 against side surface 50 maintains a secure connection of vertical member 7 to horizontal member 5.

Figure 10:
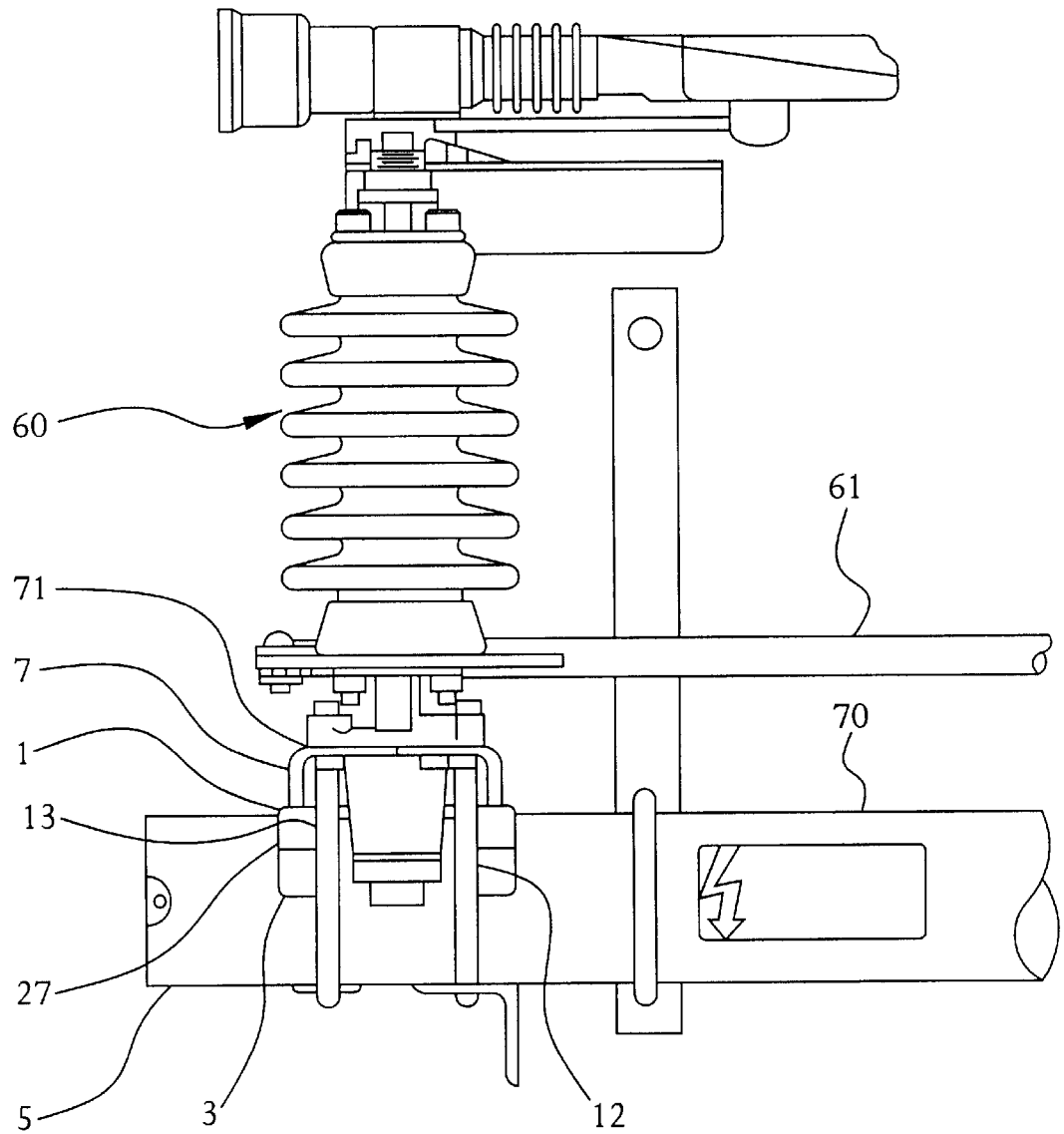
FIG. 10 is a view of a spacer according to the invention in use for securing an overhead high voltage phase switch to a horizontal support member.

Additionally, bolt holes 15 and interior edges 12, 13 of channel 11 secure against torsional movement of vertical member 7. This torsional resistance can be particularly useful when, as shown in FIG. 10, spacer 1 is used to secure an overhead high voltage power line distribution phase switch 60 against torsional rotation when rigid rod 61 rotates switch 60 to disconnect power flow through the switch. See, copending application Ser. No. 09/457,593 (attorney docket no. 39343) filed concurrently herewith and whose disclosure is incorporated herein by reference.

Figure 11:
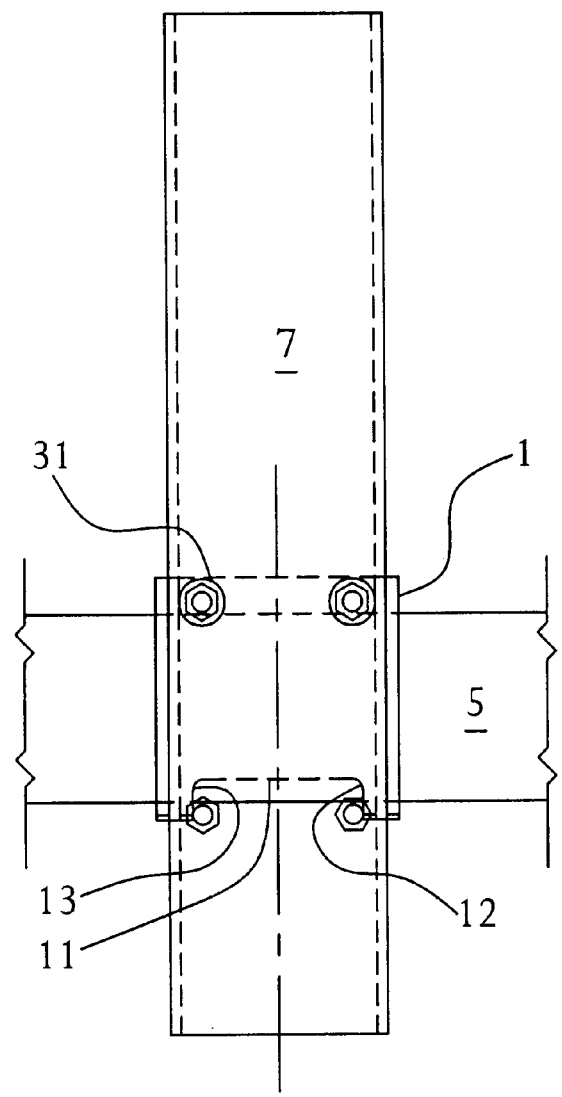
FIGS. 11 and 12 are views of the spacer of FIG. 10 for securing an overhead high voltage phase switch to a horizontal support member.
Figure 12:
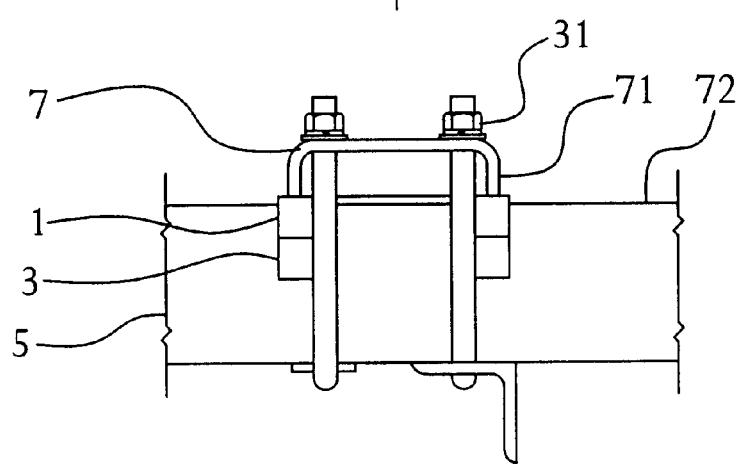

FIGS. 10–12 show spacer 1 in position when securing a horizontal member 5, such as crossarm 70 on a telephone pole, to a vertical member 7, such as channel-shaped support 71 for a high voltage interrupter switch 60 an overhead power distribution system.

I claim:

1. A base spacer plate for securing a horizontally extending first member to a vertically extending second member, comprising an extended horizontal surface and at least one deformable finger extending vertically from said horizontal surface, said horizontal surface including: (a) a pair of oval openings dimensioned to receive securing U-bolts, and (b) a channel along one edge of said base spacer plate having a length sufficient to locate U-bolts in a first horizontal direction, wherein said deformable finger extends from said horizontal surface at less than a right angle;

wherein said finger extends from said horizontal surface at an angle sufficient to contact said horizontally extending first member when positioned between said finger and U-bolts inserted into said oval openings and tightened against said vertically extending second member.

2. A base spacer plate according to claim 1 wherein inside edges of said channel are along axes parallel to said first horizontal direction.

3. A base spacer plate according to claim 1 wherein said spacer has a pair of said deformable fingers.

4. A base spacer plate according to claim 3 wherein said channel positions U-bolts between said fingers.

5. A base spacer plate according to claim 1 wherein said finger extends from said horizontal surface at an angle within the range from about 45° and 85°.

6. A base spacer plate according to claim 1 wherein said finger extends from said horizontal surface at a first angle of less than 90° for a first distance and then at a second angle of at least 90° relative to said horizontal surface.

7. A base spacer plate according to claim 6 wherein said first angle is within the range from about 45° and 85° and said second angle is greater than 90°.

8. A method for securing a vertically extending member to a horizontally extending member with a base spacer plate and a pair of U-bolts, comprising the steps of:

(a) positioning the vertically extending in member between the pair of U-bolts to secure the vertically extending member within the U-bolts;

(b) positioning the base spacer plate against the vertically extending member and over the U-bolts, the spacer including an extended horizontal surface and at least one deformable finger extending vertically from the horizontal surface, the horizontal surface including: (i) a pair of elongated openings dimensioned to receive securing bolts, and (ii) a channel along one edge of the spacer having a length sufficient to position the U-bolts with legs passing through the elongated openings, the deformable finger extending from the horizontal surface at less than a right angle and contacting the vertically extending member, (c) positioning the vertically extending member in a vertical position and/or a horizontal position, and (d) securing the U-bolts to the horizontally extending member, the deformable finger being urged to a right angle relative to the base spacer plate and against the horizontally extending member as the U-bolts are tightened.

* * * * *